US010452693B2

(12) United States Patent
Transier et al.

(10) Patent No.: US 10,452,693 B2
(45) Date of Patent: Oct. 22, 2019

(54) REORDERING OF ENRICHED INVERTED INDICES

(71) Applicant: SAP SE, Walldorf (DE)

(72) Inventors: Frederik Transier, Heidelberg (DE); Christian Lemke, Walldorf (DE); Sebastian Seifert, Weinboehla (DE)

(73) Assignee: SAP SE, Walldorf (DE)

( * ) Notice: Subject to any disclaimer, the term of this patent is extended or adjusted under 35 U.S.C. 154(b) by 213 days.

(21) Appl. No.: 15/482,518

(22) Filed: Apr. 7, 2017

(65) Prior Publication Data

US 2018/0293298 A1    Oct. 11, 2018

(51) Int. Cl.
| | |
|---|---|
| *G06F 7/00* | (2006.01) |
| *G06F 16/31* | (2019.01) |
| *G06F 16/41* | (2019.01) |
| *G06F 16/955* | (2019.01) |
| *G06F 16/22* | (2019.01) |

(52) U.S. Cl.
CPC ........ *G06F 16/319* (2019.01); *G06F 16/2228* (2019.01); *G06F 16/2264* (2019.01); *G06F 16/2272* (2019.01); *G06F 16/316* (2019.01); *G06F 16/328* (2019.01); *G06F 16/41* (2019.01); *G06F 16/955* (2019.01)

(58) Field of Classification Search
CPC ......... G06F 17/30622; G06F 17/30011; G06F 17/30672; G06F 17/30864; G06F 17/30911; G06F 16/93; G06F 16/319; G06F 16/3338; G06F 16/328; G06F 16/81
See application file for complete search history.

(56) References Cited

U.S. PATENT DOCUMENTS

| | | | | |
|---|---|---|---|---|
| 6,952,691 | B2* | 10/2005 | Drissi ................... | G06F 17/289 |
| 7,424,467 | B2* | 9/2008 | Fontoura ............... | G06F 16/951 |
| 8,423,528 | B2* | 4/2013 | Renkes ................. | G06F 16/275 |
| | | | | 707/705 |
| 8,805,808 | B2* | 8/2014 | Transier ................ | G06F 16/93 |
| | | | | 707/696 |
| 9,535,979 | B2* | 1/2017 | Ambasta .............. | G06F 16/319 |
| 2004/0103075 | A1* | 5/2004 | Kim .................... | G06F 17/2217 |
| 2009/0089256 | A1* | 4/2009 | Transier ............ | G06F 17/30613 |
| 2009/0094236 | A1* | 4/2009 | Renkes ............. | G06F 17/30336 |

(Continued)

*Primary Examiner* — Daniel K Kuddus
(74) *Attorney, Agent, or Firm* — Mintz Levin Cohn Ferris Glovsky and Popeo, P.C.

(57) ABSTRACT

A method can include: reordering an enriched inverted index associated with a database, the enriched inverted index including a first inverted list having a first plurality of current document identifiers of records that contain a first data value, the enriched inverted index further including a first data structure storing enrichment data, the reordering of the enriched inverted index comprising: generating an ordinal sequence corresponding to an order of a first plurality of current document identifiers that include a change of at least one of the first plurality of current document identifiers to a new document identifier; determining a reordered ordinal sequence corresponding to a sorted order of the second plurality of document identifiers; separately reordering, based at least on the reordered ordinal sequence, the first plurality of current document identifiers in the first inverted list and the enrichment data in the first data structure.

20 Claims, 7 Drawing Sheets

(56) References Cited

U.S. PATENT DOCUMENTS

| | | | | |
|---|---|---|---|---|
| 2011/0055257 A1* | 3/2011 | Renkes | ............ | G06F 17/30336 |
| | | | | 707/769 |
| 2012/0158718 A1* | 6/2012 | Transier | ................ | G06F 16/319 |
| | | | | 707/730 |
| 2012/0158782 A1* | 6/2012 | Transier | .................. | G06F 16/93 |
| | | | | 707/771 |
| 2013/0226869 A1* | 8/2013 | Renkes | ............ | G06F 17/30336 |
| | | | | 707/625 |
| 2013/0290345 A1* | 10/2013 | Transier | .................. | G06F 16/93 |
| | | | | 707/742 |
| 2014/0149367 A1* | 5/2014 | Benkstein | ......... | G06F 17/30551 |
| | | | | 707/693 |
| 2015/0006500 A1* | 1/2015 | Ambasta | ............... | G06F 16/319 |
| | | | | 707/706 |
| 2015/0186519 A1* | 7/2015 | Popov | ....................... | G06F 9/48 |
| | | | | 707/723 |
| 2016/0162574 A1* | 6/2016 | Gorodilov | ............. | G06Q 10/10 |
| | | | | 707/722 |
| 2018/0137115 A1* | 5/2018 | Klein | .................... | G06F 16/313 |

* cited by examiner

FIG. 1A

Mapping 150

| PREVIOUS DOC ID | REASSIGNED DOC ID |
|---|---|
| 1 | 10 |
| 5 | 1 |
| 10 | 5 |
| 7 | 13 |
| 13 | 7 |

REORDERING OF ENRICHED INVERTED INDICES

FIELD

The present disclosure generally relates to database processing and, more specifically, to the reordering of database indices.

BACKGROUND

An inverted index can provide mappings from the contents of a database to the corresponding locations in the database at which the contents are stored. For example, a typical inverted index can include a set of inverted lists. Each inverted list can be associated with a key representative of a data value such as, for example, a word and/or a number. Furthermore, each inverted list can enumerate the document identifiers of the individual records (e.g., rows, documents) in the database that contain the corresponding data values. Enriched inverted indices can provide additional information for each data value including, for example, statistics, language, part-of-speech, precise location, and/or the like.

SUMMARY

Methods, systems, and articles of manufacture, including computer program products, are provided for clustering tables. In some implementations of the current subject matter, there is provided a computer-implemented method. The method can include: reordering an enriched inverted index associated with a database, the enriched inverted index including a first inverted list having a first plurality of current document identifiers of records that contain a first data value, the enriched inverted index further including a first data structure storing enrichment data associated with the first inverted list, the reordering of the enriched inverted index comprising: generating an ordinal sequence corresponding to an order of a second plurality of document identifiers in the first inverted list, the second plurality of document identifiers including a change of at least one of the first plurality of current document identifiers to a new document identifier; determining a reordered ordinal sequence, the reordered ordinal sequence corresponding to a sorted order of the second plurality of document identifiers; first reordering, based at least on the reordered ordinal sequence, the first plurality of current document identifiers in the first inverted list; and second reordering, based at least on the reordered ordinal sequence, enrichment data stored in the first data structure, the second reordering being performed separately from the first reordering; and executing, based at least on the reordered enriched inverted index, one or more queries at the database.

In some variations, one or more of the features disclosed herein including the following features can optionally be included in any feasible combination. The enrichment data can include a statistic, a language, a part-of-speech, and/or a location associated with each occurrence of the first data value in a record. An order of the enrichment data in the first data structure can conform to an order of the first plurality of current document identifiers in the first inverted list. The enrichment data in the first data structure can be reordered to have a same order as the sorted order of the second plurality of document identifiers. The generating of the ordinal sequence can include assigning a value from an ascending sequence of values to each document identifier in the second plurality of document identifiers. The sorted order of the second plurality of document identifiers can be an ascending numerical order. The enriched inverted index can further include a second inverted list and a second data structure that is associated with the second inverted list, the second inverted list and the second data structure being reordered separately from the first inverted list and the first data structure. The first plurality of document identifiers in the first inverted list and the enrichment data stored in the first data structure can be reordered in parallel.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used to refer to same or similar items in the drawings.

DETAILED DESCRIPTION

The order in which document identifiers are assigned to individual records held in a database can affect the compression rate and search performance of the database. The optimal assignment of document identifiers can change as the contents of the database change. As such, maintaining an optimal assignment of document identifiers can require a reassignment of at least some document identifiers in response to the addition, removal, and/or update of one or more records at the database. Reassigning document identifiers typically necessitates rebuilding the existing indices associated with the database, such as an enriched inverted index, to reflect the reassignment of document identifiers. However, this rebuilding of the existing enriched inverted index can be a computationally expensive operation. Thus, in some implementations of the current subject matter, an enriched inverted index can be reordered based on the reassigned document identifiers. Moreover, the reordering of the enriched inverted index can be performed locally at the individual portions of the enriched inverted index including, for example, the inverted lists and the enrichments that form the enriched inverted index.

Figure 1A:
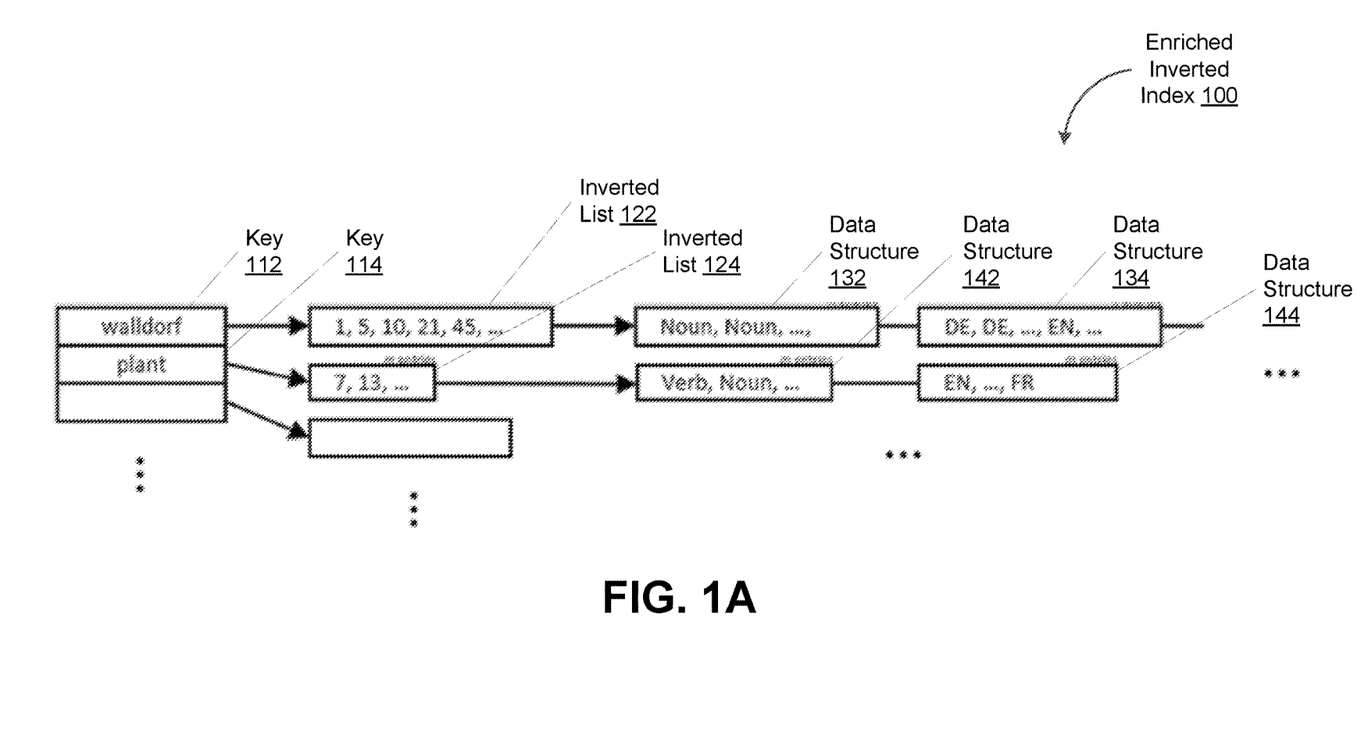
FIG. 1A depicts an enriched inverted index consistent with implementations of the current subject matter.

FIG. 1A depicts an enriched inverted index 100 consistent with implementations of the current subject matter. As shown in FIG. 1A, the enriched inverted index 100 can include a plurality of inverted lists including, for example, a first inverted list 122 and a second inverted list 124. Each inverted list can be associated with a key that is representative of a data value. Furthermore, each inverted list can enumerate the document identifier of the records in a database containing the corresponding data values. As used herein, a record can refer to any data structure in a database such as, for example, a document, a row, and/or the like.

To further illustrate, the first inverted list 122 can be associated with a first key 112 that corresponds to the data value "Walldorf" The first inverted list 122 can enumerate the document identifiers of the records that contain the data value "Walldorf". As shown in FIG. 1A, the records that contain the data value "Walldorf" can include records having the document identifiers "1," "5," "10," "21," and "45." Meanwhile, the second inverted list 124 can be associated with a second key 114 that is representative of the data value "plant." The second inverted list 124 can enumerate the document identifiers of the records that contain the data value "plant." For example, as shown in FIG. 1A, the records that contain the data value "plant" can include records having the document identifiers "7" and "13."

Referring again to FIG. 1A, the enriched inverted index 100 can further include a plurality of additional data structures that store enrichment data for the data value associated with each inverted list such as, for example, statistics, language, part-of-speech, location, and/or the like. It should be appreciated that the order of the enrichment data in the additional data structures can conform to the order of the document identifiers in the corresponding inverted list. To further illustrate, the first inverted list 122 can be associated with a first data structure 132 and a second data structure 134. The first data structure 132 can store the part-of-speech for each occurrence of the data value "Walldorf" in the records having the document identifiers set forth in the first inverted list 122. For example, according to the enrichment data from the first data structure 132, the data value "Walldorf" appears as a noun both in the record having the document identifier "1" and in the record having the document identifier "5." Meanwhile, the second data structure 134 can store the language of each occurrence of the data value "Walldorf" in the corresponding records. For instance, according to the enrichment data from the second data structure 134, the data value "Walldorf" appears in German in both the record having the document identifier "1" and the record having the document identifier "5." It should be appreciated that the first inverted list 122 can be associated with the first data structure 132 and/or the second data structure 134 by storing a pointer and/or a reference to the first data structure 132 and/or the second data structure 134. However, the first inverted listed 122 can be associated with the first data structure 132 and/or the second data structure 134 in a different manner.

The second inverted list 124 can be associated with a third data structure 142 and a fourth data structure 144. As shown in FIG. 1A, the third data structure 142 can store the part-of-speech for each occurrence of the data value "plant" in the records that have the document identifiers set forth in the second inverted list 124. For example, according to the enrichment data from the third data structure 142, the data value "plant" appears as a verb in the record having the document identifier "7" and as a noun in the record having the document identifier "13." Meanwhile, the fourth data structure 144 can store the language of each occurrence of the data value "plant" in the corresponding records. For instance, according to the enrichment data from the fourth data structure 144, the data value "plant" appears in English in the record having the document identifier "7." It should be appreciated that the second inverted list 124 can be associated with the third data structure 142 and/or the fourth data structure 144 in any manner including, for example, by storing a pointer and/or a reference to the third data structure 142 and/or the fourth data structure 144.

Figure 2:
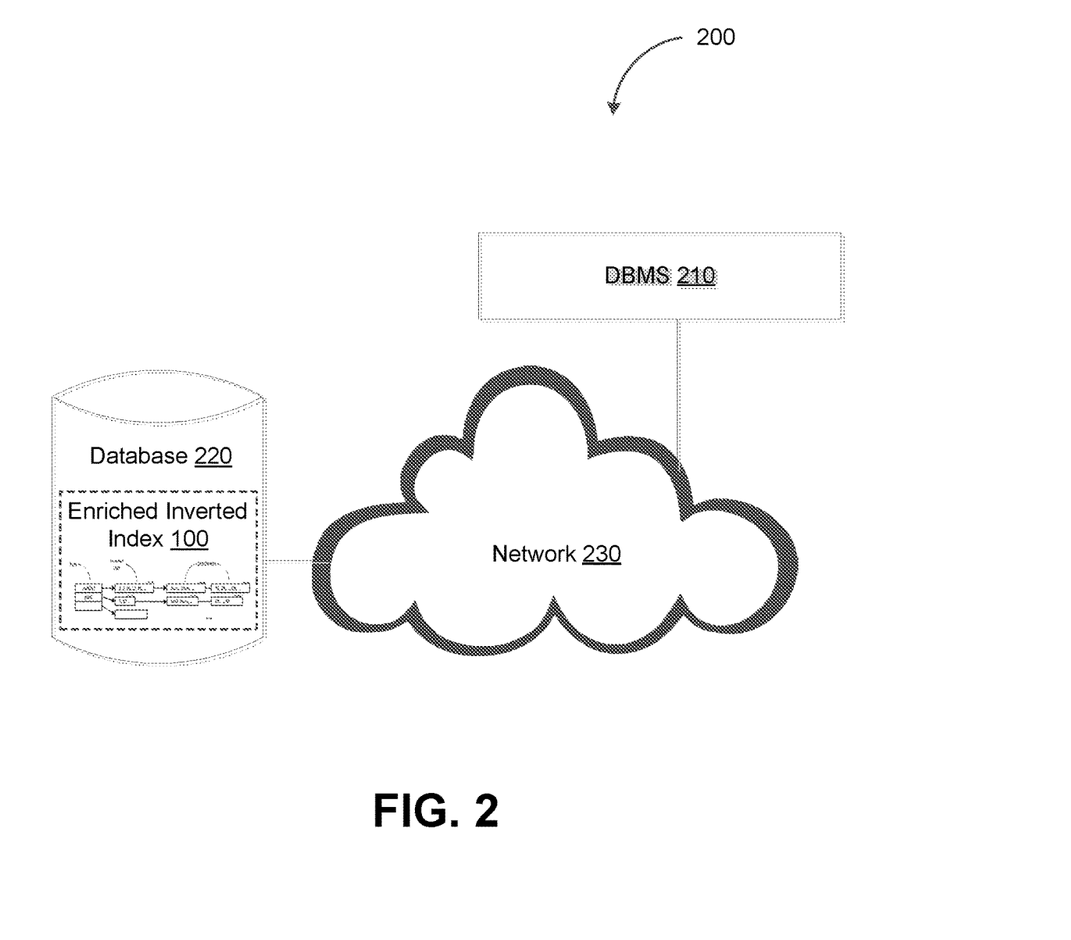
FIG. 2 depicts a system diagram illustrating a database system consistent with implementations of the current subject matter.

FIG. 2 depicts a system diagram illustrating a database system 200 consistent with implementations of the current subject matter. Referring to FIG. 2, the database system 200 can include a database management system DBMS 210 that is communicatively coupled, for example via a network 230, to a database 220. The network 230 can be any wired and/or wireless network including, for example, a wide area network (WAN), a local area network (LAN), the Internet, and/or the like. The database 220 can be any type of database including, for example, a relational database, a non-structure query language (NoSQL) database, and/or the like.

The database 220 can be associated with one or more indices including, for example, the enriched inverted index 100. The enriched inverted index 100 can be stored, for example, at the DBMS 210 and/or the database 220. In some implementations of the current subject matter, the enriched inverted index 100 can include a plurality of inverted lists such as, for example, the first inverted list 122 and the second inverted list 124. The enriched inverted index 100 can further include a plurality of data structures such as, for example, the first data structure 132, the second data structure 134, the third data structure 142, and the fourth data structure 144. Each inverted list can enumerate the document identifiers of the records containing a data value such as, for example, "Walldorf" and "plant." The additional data structures that are associated with each inverted list can store enrichment data associated with the corresponding data value including, for example, statistics, language, part-of-speech, precise location, and/or the like. The DBMS 210 can use the enriched inverted index 100 to execute one or more queries with respect to the contents of the database 220. For example, the DBMS 210 can perform, based on the enriched inverted index 100, a search for a specific data value and/or a range of data values in the database 220. On example query may ask for documents in the DBMS 210 where a particular data value (e.g., "Walldorf") appears in a certain language (e.g., German) and/or is used as a specific part-of-speech (e.g., noun).

In some implementations of the current subject matter, the DBMS 210 can be configured to reorder an enriched inverted index such as, for example, the enriched inverted index 100. The DBMS 210 can reorder the enriched inverted index 100 in response to a reassignment in the document identifiers associated with one or more records held at the database 220. Reassigning document identifiers can include changing the current document identifier that is assigned to at least one record held at the database 220 to a different document identifier. As such, the reassignment of the document identifiers associated with one or more records can be associated with a mapping from the previous document identifiers of the records to the reassigned document identifiers of these records.

Figure 1B:
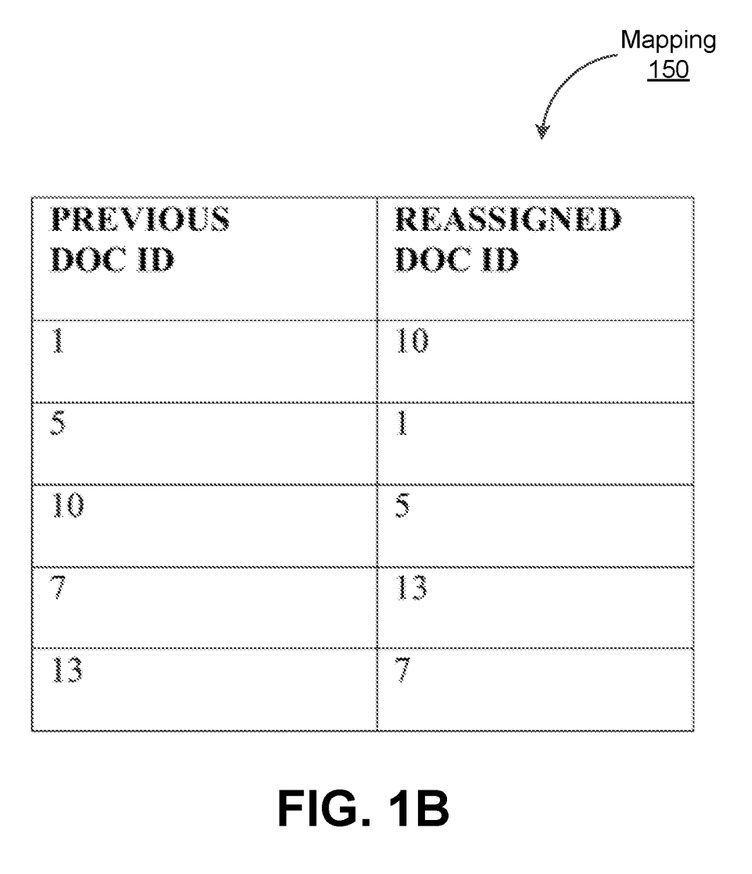
FIG. 1B depicts a mapping from previous document identifiers to reassigned document identifiers consistent with implementations of the current subject matter.

To further illustrate, FIG. 1B depicts a mapping 150 from previous document identifiers to reassigned document identifiers. As indicated by the mapping 150, the record previously assigned the document identifier "1" can be reassigned the document identifier "10" while the record previously assigned the document identifier "5" can be reassigned the document identifier "1" and the record previously assigned the document identifier "10" can be reassigned the document identifier "5." Meanwhile, the record previously assigned the document identifier "7" can be reassigned the document identifier "13" while the record previously assigned the document identifier "13" can be reassigned the document identifier "7."

In some implementations of the current subject matter, the DBMS 210 can reorder each inverted list (e.g., the first inverted list 122, the second inverted list 124) and the additional data structures (e.g., the first data structure 132, the second data structure 134, the third data structure 142, the fourth data structure 144) in the enriched inverted index 100. The reordering of an inverted list can include determining an original ordinal sequence for the inverted list.

Figure 1C:
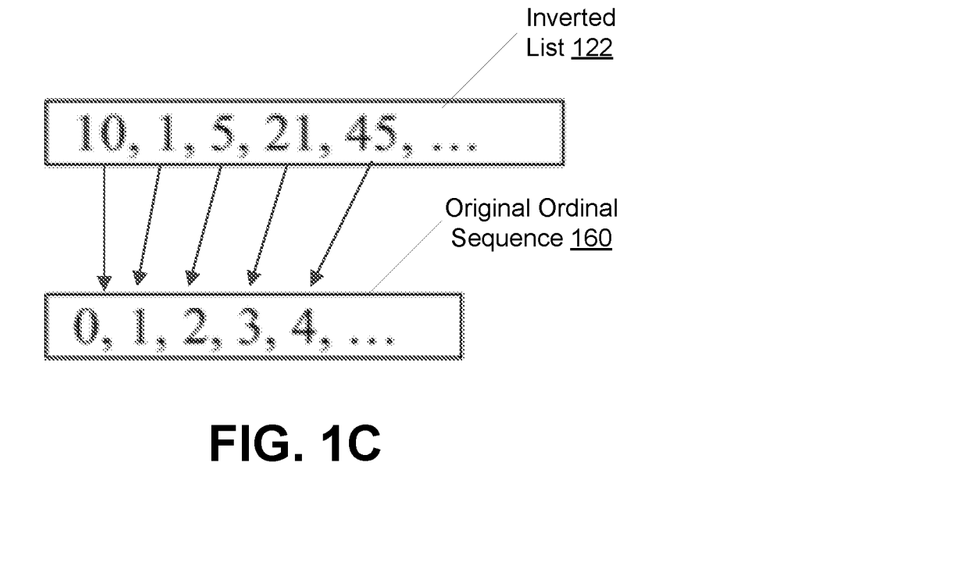
FIG. 1C depicts an original ordinal sequence consistent with implementations of the current subject matter.

FIG. 1C depicts an original ordinal sequence 160 of the first inverted list 122 subsequent to reassigning one or more document identifiers in accordance with the mapping 150. As shown in FIG. 1C, applying the mapping 150 to the first inverted list 122 includes reassigning the record that is originally associated with the document identifier "1" with the document identifier "10" and reassigning the record that is originally associated with the document identifier "5" with the document identifier "1." Alternately and/or additionally, applying the mapping to the first inverted list 122 includes reassigning the record that is originally associated with the document identifier "10" with the document identifier "5."

Referring to FIG. 1C, the original ordinal sequence 160 can correspond to the original ordinal sequence of the first inverted list 122 subsequent to the reassignment of one or more document identifiers. As shown in FIG. 1C, the original ordinal sequence 160 can be generated by assigning, to each document identifier in the first inverted list 122, a numerical value from an ascending sequence of numerical values (e.g., 0, 1, 2, . . . , n−1). For instance, the first document identifier "10" in the first inverted list 122 can be assigned the numerical value of "0," the second document identifier "1" in the first inverted list 122 can be assigned the numerical value "1," the third document identifier "5" in the first inverted list 122 can be assigned the numerical value "2," and so forth. However, it should be appreciated that other types of values can also be assigned to each document identifier in the first inverted list 122 in order to generate the original ordinal sequence 160.

In some implementations of the current subject matter, subsequent to the reassignment of one or more document identifiers in the first inverted list 122, the DBMS 210 can sort the first inverted list 122, for example, in an ascending order. Furthermore, the DBMS 210 can reorder the original ordinal sequence 160 to generate a reordered ordinal sequence that reflects the reassignment and reordering that was applied to the first inverted list 122. Furthermore, the same reordering can be propagated to the corresponding enrichment data based on the reordered ordinal sequence.

Figure 1D:
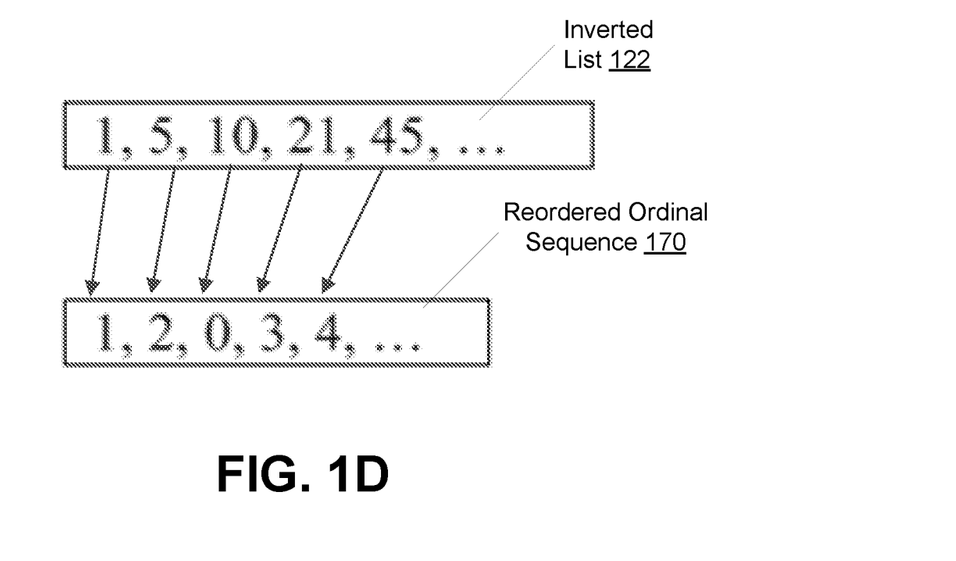
FIG. 1D depicts an reordered ordinal sequence consistent with implementations of the current subject matter.

FIG. 1D depicts a reordered ordinal sequence 170 consistent with implementations of the current subject matter. According to some implementations of the current subject matter, the DBMS 210 can generate the reordered ordinal sequence 170 for the first inverted list 122 subsequent to reassigning one or more document identifiers in the first inverted list 122 and reordering the first inverted list 122 (e.g., in an ascending order). The reordered ordinal sequence 170 can enumerate a sequence of numerical values, such as integers, that reflect the order of the reassigned and reordered document identifiers in the first inverted list 122.

To further illustrate, FIG. 1D shows that the first inverted list 122 with reassigned document identifiers. As shown in FIG. 1D, sorting the first inverted list 122 includes moving the record that is reassigned the document identifier "1" to the beginning of the first inverted list 122. As such, the numerical value "1" that is associated with the document identifier "1" is also moved to a corresponding position in the reordered ordinal sequence 170. Sorting the first inverted list 122 can also include moving the record that is reassigned the document identifier "5" to the second spot in the first inverted list 122. Accordingly, the numerical value "2" associated with the document identifier "5" is also moved to a corresponding position in the reordered ordinal sequence 170. Alternately and/or additionally, sorting the first inverted list 122 can include moving the record that is reassigned the document identifier "10" to the third spot in the first inverted list 122. Here, the numerical value "0" that is associated with the document identifier "10" is also moved to a corresponding position in the reordered ordinal sequence 170.

In some implementations of the current subject matter, the DBMS 210 can reorder the first inverted list 122 based on the reordered ordinal sequence 170. For example, the DBMS 210 can change the positions of the document identifiers in the first inverted list 122 from the original ordinal sequence 160 to the reordered ordinal sequence 170. The DBMS 210 can further reorder, based on the reordered ordinal sequence 170, the enrichment data in the first data structure 132 and/or the second data structure 134 associated with the first inverted list 122. The enrichment data in the first data structure 132 and/or the second data structure 134 can be reordered in order to match the reassignment and reordering of document identifiers at the database 220. As noted earlier, the order of the enrichment in the first data structure 132 and/or the second data structure 134 can conform to the order of the document identifiers in the first inverted list 122. Thus, the enrichment data in the first data structure 132 and/or the second data structure 134 can be reordered, in accordance with the reordered ordinal sequence 170, in a same manner as the document identifiers in the first inverted list 122. For example, based on the reordered ordinal sequence 170, the part-of-speech for the occurrence of the data value "Walldorf" in the record originally assigned the document identifier "1" can now be the second entry in the first data structure 132 while the part-of-speech for the occurrence of the data value "Walldorf" in the record originally assigned the document identifier "10" can now be the first entry in the first data structure 132.

It should be appreciated that the DBMS 210 can reorder the inverted lists and/or the data structures containing the enrichment data in parallel and/or in sequence. For example, the DBMS 210 can reorder the first inverted list 122, the first data structure 132, and/or the second data structure 134 in parallel. Alternately and/or additionally, the DBMS 210 can reorder the first inverted list 122, the first data structure 132, and/or the second data structure 134 in sequence.

Figure 3:
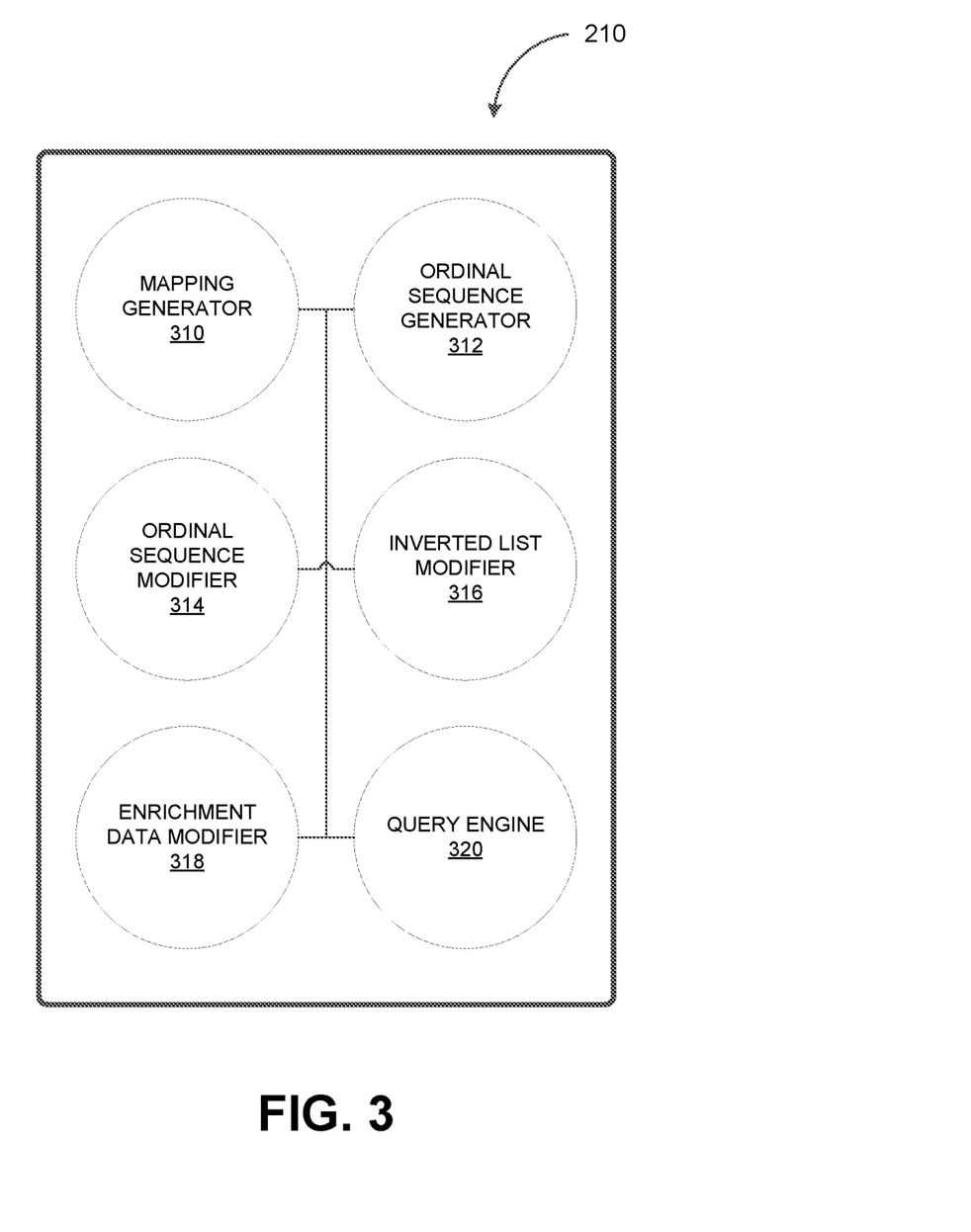
FIG. 3 depicts a block diagram illustrating a database management system (DBMS) consistent with implementations of the current subject matter.

FIG. 3 depicts a block diagram illustrating the DBMS 210 consistent with implementations of the current subject matter. Referring to FIGS. 1-3, the DBMS 210 can include a mapping generator 310, an ordinal sequence generator 312, an ordinal sequence modifier 314, an inverted list modifier 316, an enrichment data modifier 318, and a query engine 320. However, it should be appreciated that the DBMS 210 can include additional and/or different components than shown.

In some implementations of the current subject matter, the mapping generator 310 can generate mappings, such as the mapping 150, which can enumerate the previous document identifiers that are assigned to one or more records at the database 220 and the corresponding document identifiers that have been reassigned to these records. For example, as shown in FIG. 1B, the mapping 150 can indicate that a record previously assigned the document identifier "1" can be reassigned the document identifier "10" while the record previously assigned the document identifier "5" can be reassigned the document identifier "1" and the record previously assigned the document identifier "10" can be reassigned the document identifier "5." The mapping 150 can further indicate that the record previously assigned the document identifier "7" can be reassigned the document identifier "13" while the record previously assigned the document identifier "13" can be reassigned the document identifier "7."

The ordinal sequence generator 312 can be configured to generate an original ordinal sequence, such as the original ordinal sequence 160, for one or more inverted lists that form an enriched inverted index, such as the first inverted list 122 and/or the second inverted list 124, which form the enriched inverted index 100. In some implementations of the current subject matter, the ordinal sequence generator 312 can generate the original ordinal sequence 160 for the first inverted list 122 subsequent to the reassignment of one or more document identifiers in the first inverted list 122. For instance, the ordinal sequence generator 312 can assign, to each document identifier in the first inverted list 122, a value from an ascending sequence of values. As shown in FIG. 1C, the original ordinal sequence 160 can be an ascending sequence of numerical values (e.g., 0, 1, 2, . . . , n−1). Each numerical value from this ascending sequence of numerical values can be assigned to a corresponding document identifier in the first inverted list 122. For example, the first document identifier "10" in the first inverted list 122 can be assigned the numerical value of "0," the second document identifier "1" in the first inverted list 122 can be assigned the numerical value "1," the third document identifier "5" in the first inverted list 122 can be assigned the numerical value "2," and so forth.

In some implementations of the current subject matter, the ordinal sequence modifier 314 can be configured to generate a reordered ordinal sequence such as, for example, the reordered ordinal sequence 170. For example, the ordinal sequence modifier 314 can generate the reordered ordinal sequence 170 by at least modifying the original ordinal sequence 160 to reflect a reordering of the first inverted list 122. As shown in FIG. 1D, the record that is reassigned the document identifier "1" can be moved to the first spot in the first inverted list 122. As such, the ordinal sequence modifier 314 can also move the corresponding numerical value "1" to the first spot in the reordered ordinal sequence 170. The record that is reassigned the document identifier "5" can be moved to the second spot in the first inverted list 122. Accordingly, the ordinal sequence modifier 314 can also move the corresponding numerical value "2" to the second spot in the reordered ordinal sequence 170. Furthermore, the record that is reassigned the document identifier "10" can be moved to the third spot in the first inverted list 122. Here, the ordinal sequence modifier 314 can move the corresponding numerical value "0" to the third spot in the reordered ordinal sequence 170.

In some implementations of the current subject matter, the inverted list modifier 316 can be configured to reorder one or more inverted lists, such as the first inverted list 122 and/or the second inverted list 124, based on a corresponding reordered ordinal sequence such as, for example, the reordered ordinal sequence 170. For example, applying the reordered ordinal sequence 170 to the first inverted list 122 can include changing the positions occupied by one or more document identifiers in the first inverted list 122 to reflect reassignment of document identifiers. As shown in FIG. 1D, the document identifier "10" can occupy a position in the first inverted list 122 previously occupied by the document identifier "1" in the first inverted list 122 because that record has been reassigned with the document identifier "10." Similarly, the document identifier "1" can occupy a position in the first inverted list 122 previously occupied by the document identifier "5" because that record has been reassigned with the document identifier "1."

The enrichment data modifier 318 can be configured to reorder, based on a reordered ordinal sequence such as the reordered ordinal sequence 170, the enrichment data held in one or more additional data structures such as, for example, the first data structure 132, the second data structure 134, the third data structure 142, and/or the fourth data structure 144. For example, the order of the enrichment in the first data structure 132 and/or the second data structure 134 can conform to the order of the document identifiers in the first inverted list 122. As such, the enrichment data in the first data structure 132 and/or the second data structure 134 can be reordered, in accordance with the reordered ordinal sequence 170, in a same manner as the document identifiers in the first inverted list 122.

To further illustrate, based on the reordered ordinal sequence 170, the part-of-speech for the occurrence of the data value "Walldorf" in the record originally assigned the document identifier "1" can now be the second entry in the first data structure 132 while the part-of-speech for the occurrence of the data value "Walldorf" in the record originally assigned the document identifier "10" can now be the first entry in the first data structure 132.

In some implementations of the current subject matter, the query engine 320 can be configured to execute one or more queries with respect to the contents of the database 220. For example, the query engine 320 can execute the queries (e.g., a search for a data value and/or a range of data values) based on a reordered enriched inverted index such as, for example, the enriched inverted index 100 when the portions of the enriched inverted index 100 (e.g., the first inverted list 122, the second inverted list 124, the first data structure 132, the second data structure 134, the third data structure 142, the fourth data structure 144) have been reordered individually based on the reordered ordinal sequence 170.

Figure 4:
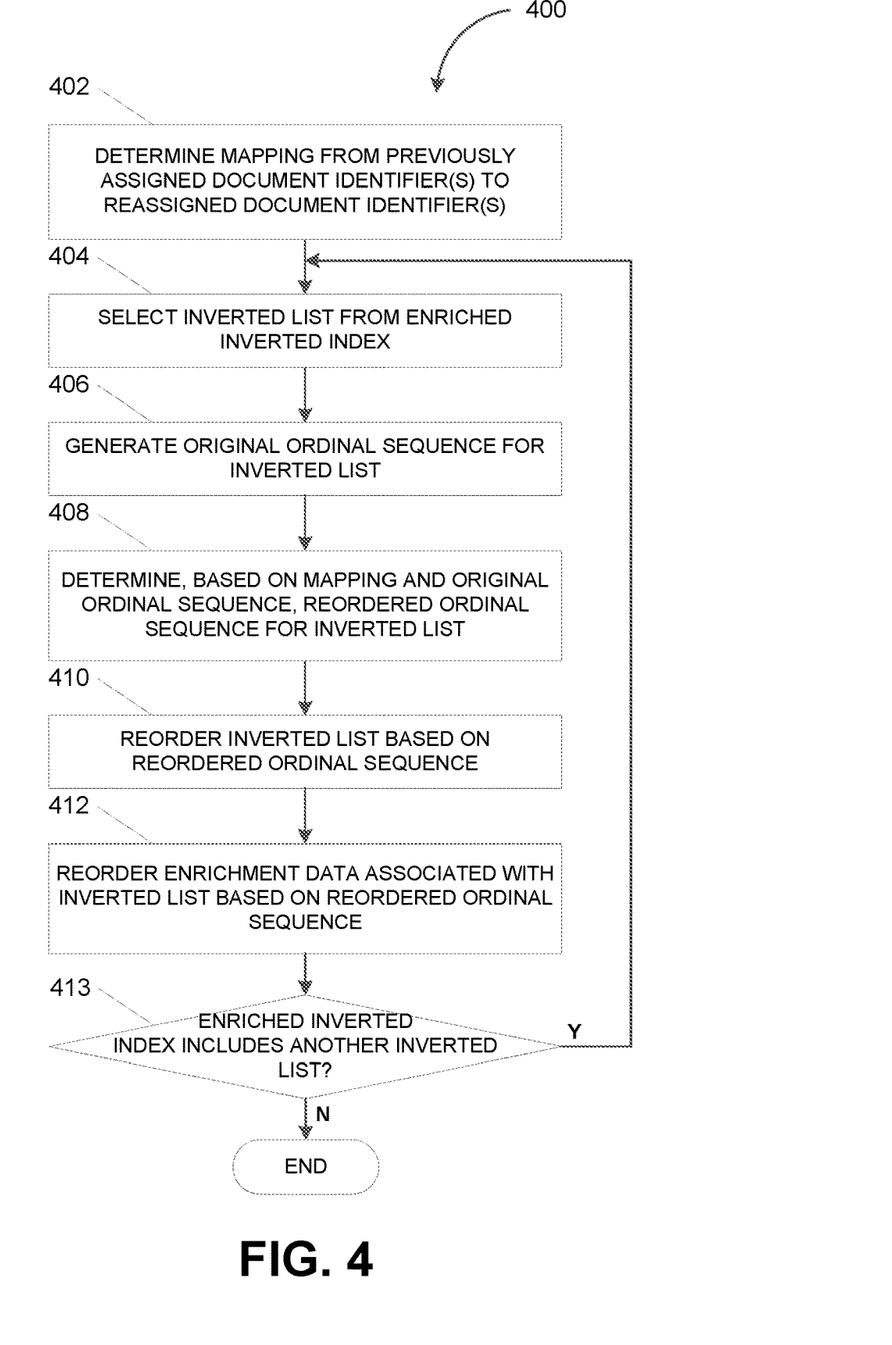
FIG. 4 depicts a flowchart illustrating a process for reordering an enriched inverted index consistent with implementations of the current subject matter.

FIG. 4 depicts a flowchart illustrating a process 400 for reordering an enriched inverted index consistent with implementations of the current subject matter. Referring to FIGS. 1-4, the process 400 can be performed by the DBMS 210. In some implementations of the current subject matter, the DBMS 210 can perform the process 400 to iteratively reorder each inverted list in an enriched inverted index such as, for example, the enriched inverted index 100. Furthermore, the DBMS 210 can perform the process 400 to reorder the data structures that store the enrichment data associated with each inverted list in the enriched inverted index.

The DBMS 210 can determine a mapping from one or more previously assigned document identifiers to one or more corresponding reassigned document identifiers (402). In some implementations of the current subject matter, the DBMS 210 (e.g., the mapping generator 310) can generate the mapping 150 to indicate the previously document identifiers assigned one or more records held at the database 220 and the corresponding reassigned document identifiers for these records. Alternately and/or additionally, the DBMS 210 can receive the mapping 150 from another source such as, for example, a user of the DBMS 210.

The DBMS 210 can select an inverted list from an enriched inverted index (404). For instance, the DBMS 210 can select the first inverted list 122. The DBMS 210 can generate an original ordinal sequence for the inverted list (406). In some implementations of the current subject matter, the DBMS 210 (e.g., the ordinal sequence generator 312) can generate the original ordinal sequence 160 for the first inverted list 122 subsequent to reassigning one or more document identifiers in the first inverted list 122 based on the mapping 150. For example, the DBMS 210 can generate the original ordinal sequence 160 by assigning an ascending sequence of values, such as numerical values, to the document identifiers in the first inverted list 122. As shown in FIG. 1C, the original ordinal sequence 160 can be an ascending sequence of numerical values (e.g., 0, 1, 2, ..., n−1). Each numerical value from this ascending sequence of numerical values can be assigned to a corresponding document identifier in the first inverted list 122. For example, the first reassigned document identifier "10" in the first inverted list 122 can be assigned the numerical value of "0," the second reassigned document identifier "1" in the first inverted list 122 can be assigned the numerical value "1," the third reassigned document identifier "5" in the first inverted list 122 can be assigned the numerical value "2," and so forth.

The DBMS 210 can determine, based on the mapping and the original ordinal sequence, a reordered ordinal sequence for the inverted list (408). In some implementations of the current subject matter, the DBMS 210 (e.g., the ordinal sequence modifier 314) can generate the reordered ordinal sequence 170 for the first inverted list 122. For example, the DBMS 210 can generate the reordered ordinal sequence 170 based on the mapping 150 and the original ordinal sequence 160 of the first inverted list 122. The reordered ordinal sequence 170 can be generated by reordering the reassigned document identifiers in the first inverted list 122 in an ascending order and reordering the sequence of numerical values in the original ordinal sequence 160 to reflect the reassignment and reordering of the document identifiers in the first inverted list 122. For instance, the numerical value "1" occupies the first spot in the reordered ordinal sequence 170 because the reassigned document identifier "1" is moved from the second spot to the first spot when the first inverted list 122 is sorted in an ascending order. The numerical value "2" occupies the second spot in the reordered ordinal sequence 170 because the reassigned document identifier "5" is moved from the third spot to the second spot when the first inverted list 122 is sorted in an ascending order. Furthermore, the numerical value "0" occupies the third spot in the reordered ordinal sequence 170 because the reassigned document identifier "10" is moved from the first spot to the third spot in the sorting of the first inverted list 122.

The DBMS 210 can reorder the inverted list based on the reordered ordinal sequence (410). In some implementations of the current subject matter, the DBMS 210 (e.g., the inverted list modifier 316) can reorder the first inverted list 122 based on the reordered ordinal sequence 170. For example, applying the reordered ordinal sequence 170 to the first inverted list 122 can include changing the positions occupied by one or more reassigned document identifiers in the first inverted list 122 to reflect the changes in the document identifiers that are assigned to the records in the first inverted list 122. As shown in FIG. 1C, the document identifier "10" can occupy a position in the first inverted list 122 previously occupied by the document identifier "1" in the first inverted list 122 because that record has been reassigned with the document identifier "10." Similarly, the document identifier "1" can occupy a position in the first inverted list 122 previously occupied by the document identifier "5" because that record has been reassigned with the document identifier "1."

The DBMS 210 can reorder enrichment data associated with the inverted list based on the reordered ordinal sequence (412). In some implementations of the current subject matter, the DBMS 210 (e.g., the enrichment data modifier 318) can be configured to reorder the first data structure 132 and/or the second data structure 132, which store the enrichment data associated with the first inverted list 122. The order of the enrichment in the first data structure 132 and/or the second data structure 134 can conform to the order of the document identifiers in the first inverted list 122. As such, the enrichment data in the first data structure 132 and/or the second data structure 134 can be reordered, in accordance with the reordered ordinal sequence 170, in a same manner as the document identifiers in the first inverted list 122. For instance, based on the reordered ordinal sequence 170, the part-of-speech for the occurrence of the data value "Walldorf" in the record originally assigned the document identifier "1" can now be the second entry in the first data structure 132 while the part-of-speech for the occurrence of the data value "Walldorf" in the record originally assigned the document identifier "10" can now be the first entry in the first data structure 132.

The DBMS 210 can determine whether the enriched inverted index includes another inverted list (413). For example, the DBMS 210 can determine whether the enriched inverted index 100 contains any additional inverted lists that require reordering. If the DBMS 210 determines that the enriched inverted index does not include another inverted list (413-N), the process 400 can terminate. For instance, the process 400 can terminate if the DBMS 210 determines that every inverted list (e.g., the first inverted list 122, the second inverted list 124) in the enriched inverted index 100 have been reordered. Alternately and/or additionally, the DBMS 210 can determine that the enriched inverted index does include another inverted list (413-Y). As such, the process 400 can resume at operation 404 where the DBMS 210 selects an inverted list from the enriched inverted index. To further illustrate, if the DBMS 210 determines that the enriched inverted list 100 includes one or more remaining inverted list that still requires reordering, the process 400 can continue with the DBMS 210 selecting one of the remaining inverted list.

It should be appreciated that one or more operations in the process 400 can be performed in a different order than shown including, for example in parallel. For example, the reordering of an inverted list in operation 410 and the reordering of the corresponding enrichment data in operation 412 can be performed in sequence and/or in parallel. Alternately and/or additionally, at least some operations in the process 400 can be omitted and/or repeated.

Figure 5:
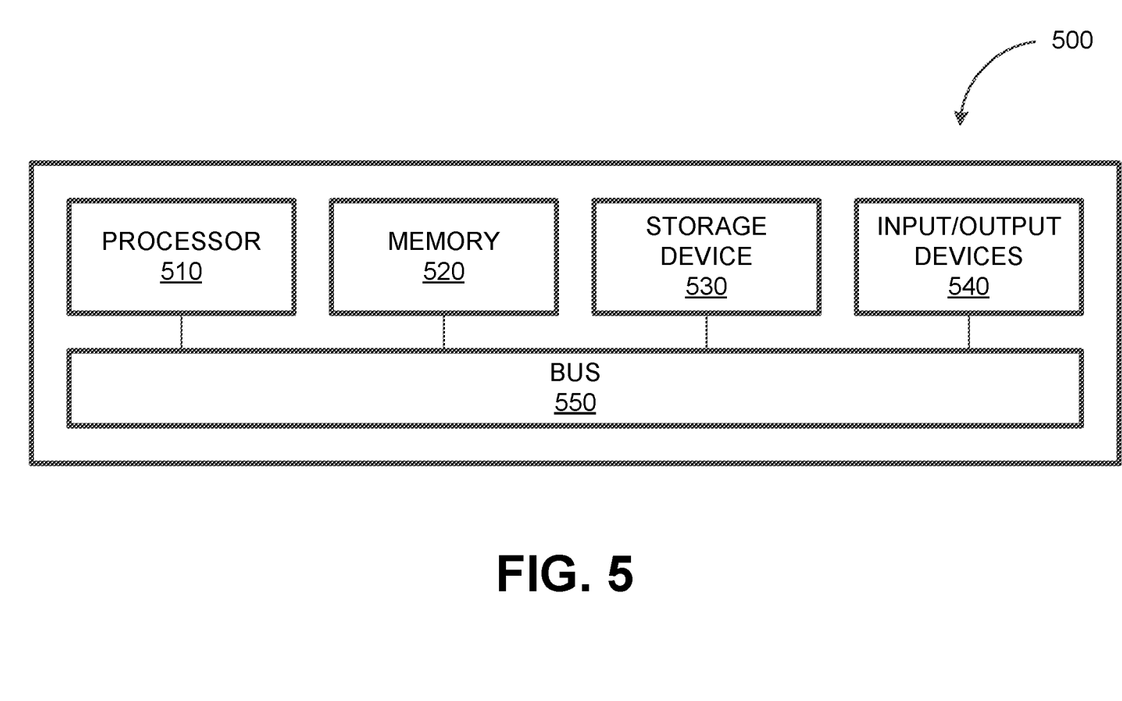
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 2-3 and 5, the computing system 500 can be used to implement the DBMS 210 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the DBMS 210. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer implemented method, comprising:
    reordering an enriched inverted index associated with a database, the enriched inverted index including a first inverted list having a first plurality of current document identifiers of records that contain a first data value, the enriched inverted index being reordered in response to at least one of the first plurality of document identifiers being changed to a different document identifier, the enriched inverted index further including a first data structure storing enrichment data associated with the first inverted list, the reordering of the enriched inverted index comprising:
        generating an ordinal sequence corresponding to an order of a second plurality of document identifiers in the first inverted list, the second plurality of document identifiers including the change of the at least one of the first plurality of current document identifiers to the different document identifier;
        determining a reordered ordinal sequence, the reordered ordinal sequence corresponding to a sorted order of the second plurality of document identifiers;
        first reordering, based at least on the reordered ordinal sequence, the first plurality of current document identifiers in the first inverted list; and
        second reordering, based at least on the reordered ordinal sequence, enrichment data stored in the first data structure, the second reordering being performed separately from the first reordering; and
    executing, based at least on the reordered enriched inverted index, a query to retrieve, from the database, the records containing the first data value subsequent to the at least one of the first plurality of document identifiers being changed to the different document identifier.

2. The computer-implemented method of claim 1, wherein the enrichment data comprises at least one of a statistic, a language, a part-of-speech, and a location associated with each occurrence of the first data value in a record.

3. The computer-implemented method of claim 1, wherein an order of the enrichment data in the first data structure conforms to an order of the first plurality of current document identifiers in the first inverted list.

4. The computer-implemented method of claim 3, wherein the enrichment data in the first data structure is reordered to have a same order as the sorted order of the second plurality of document identifiers.

5. The computer-implemented method of claim 1, wherein the generating of the ordinal sequence comprises assigning a value from an ascending sequence of values to each document identifier in the second plurality of document identifiers.

6. The computer-implemented method of claim 1, wherein the sorted order of the second plurality of document identifiers comprises an ascending numerical order.

7. The computer-implemented method of claim 1, wherein the enriched inverted index further includes a second inverted list and a second data structure that is associated with the second inverted list, the second inverted list and the second data structure being reordered separately from the first inverted list and the first data structure.

8. The computer-implemented method of claim 1, wherein the first plurality of document identifiers in the first inverted list and the enrichment data stored in the first data structure are reordered in parallel.

9. A system, comprising:
    at least one processor; and
    at least one memory storing instructions which, when executed by the at least one processor, result in operations comprising:
        reordering an enriched inverted index associated with a database, the enriched inverted index including a first inverted list having a first plurality of current document identifiers of records that contain a first data value, the enriched inverted index being reordered in response to at least one of the first plurality of document identifiers being changed to a different document identifier, the enriched inverted index further including a first data structure storing enrichment data associated with the first inverted list, the reordering of the enriched inverted index comprising:
            generating an ordinal sequence corresponding to an order of a second plurality of document identifiers in the first inverted list, the second plurality of document identifiers including the change of the at least one of the first plurality of current document identifiers to the different document identifier;
            determining a reordered ordinal sequence, the reordered ordinal sequence corresponding to a sorted order of the second plurality of document identifiers;
            first reordering, based at least on the reordered ordinal sequence, the first plurality of current document identifiers in the first inverted list; and
            second reordering, based at least on the reordered ordinal sequence, enrichment data stored in the first data structure, the second reordering being performed separately from the first reordering; and
        executing, based at least on the reordered enriched inverted index, a query to retrieve, from the database, the records containing the first data value subsequent to the at least one of the first plurality of document identifiers being changed to the different document identifier.

10. The system of claim 9, wherein the enrichment data comprises at least one of a statistic, a language, a part-of-speech, and a location associated with each occurrence of the first data value in a record.

11. The system of claim 9, wherein the generating of the ordinal sequence comprises assigning a value from an ascending sequence of values to each document identifier in the second plurality of document identifiers.

12. The system of claim 9, wherein the sorted order of the second plurality of document identifiers comprises an ascending numerical order.

13. The system of claim 9, wherein the enriched inverted index further includes a second inverted list and a second data structure that is associated with the second inverted list, the second inverted list and the second data structure being reordered separately from the first inverted list and the first data structure.

14. The system of claim 9, wherein the first plurality of document identifiers in the first inverted list and the enrichment data stored in the first data structure are reordered in parallel.

15. A non-transitory computer-readable storage medium including program code, which when executed by at least one data processor, cause operations comprising:
  reordering an enriched inverted index associated with a database, the enriched inverted index including a first inverted list having a first plurality of current document identifiers of records that contain a first data value, the enriched inverted index being reordered in response to at least one of the first plurality of document identifiers being changed to a different document identifier, the enriched inverted index further including a first data structure storing enrichment data associated with the first inverted list, the reordering of the enriched inverted index comprising:
    generating an ordinal sequence corresponding to an order of a second plurality of document identifiers in the first inverted list, the second plurality of document identifiers including the change of the at least one of the first plurality of current document identifiers to the different document identifier;
    determining a reordered ordinal sequence, the reordered ordinal sequence corresponding to a sorted order of the second plurality of document identifiers;
    first reordering, based at least on the reordered ordinal sequence, the first plurality of current document identifiers in the first inverted list; and
    second reordering, based at least on the reordered ordinal sequence, enrichment data stored in the first data structure, the second reordering being performed separately from the first reordering; and
  executing, based at least on the reordered enriched inverted index, a query to retrieve, from the database, the records containing the first data value subsequent to the at least one of the first plurality of document identifiers being changed to the different document identifier.

16. The non-transitory computer-readable storage medium of claim 15, wherein the enrichment data comprises at least one of a statistic, a language, a part-of-speech, and a location associated with each occurrence of the first data value in a record.

17. The non-transitory computer-readable storage medium of claim 15, wherein the generating of the ordinal sequence comprises assigning a value from an ascending sequence of values to each document identifier in the second plurality of document identifiers.

18. The non-transitory computer-readable storage medium of claim 15, wherein the sorted order of the second plurality of document identifiers comprises an ascending numerical order.

19. The non-transitory computer-readable storage medium of claim 15, wherein the enriched inverted index further includes a second inverted list and a second data structure that is associated with the second inverted list, the second inverted list and the second data structure being reordered separately from the first inverted list and the first data structure.

20. The non-transitory computer-readable storage medium of claim 15, wherein the first plurality of document identifiers in the first inverted list and the enrichment data stored in the first data structure are reordered in parallel.

* * * * *